US010187226B1

(12) United States Patent
Farkas et al.

(10) Patent No.: US 10,187,226 B1
(45) Date of Patent: Jan. 22, 2019

(54) METHODS, SYSTEMS, AND COMPUTER PROGRAM PRODUCTS FOR JOINTLY PROCESSING MULTIPLE SECTORS IN A WIRELESS COMMUNICATION NETWORK

(71) Applicant: Collision Communications, Inc., Peterborough, NH (US)

(72) Inventors: Joseph Farkas, Merrimack, NH (US); Brandon Hombs, Merrimack, NH (US); Sayak Bose, Nashua, NH (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 0 days.

(21) Appl. No.: 15/796,648

(22) Filed: Oct. 27, 2017

(51) Int. Cl.
| | |
|---|---|
| *H04B 7/02* | (2018.01) |
| *H04B 1/71* | (2011.01) |
| *H04J 11/00* | (2006.01) |
| *H04L 5/00* | (2006.01) |
| *H04L 25/02* | (2006.01) |
| *H04B 7/0452* | (2017.01) |
| *H04B 7/08* | (2006.01) |
| *H04W 72/08* | (2009.01) |
| *H04B 1/7103* | (2011.01) |
| *H04L 25/03* | (2006.01) |
| *H04B 7/024* | (2017.01) |

(52) U.S. Cl.
CPC ......... *H04L 25/024* (2013.01); *H04B 7/0452* (2013.01); *H04B 7/086* (2013.01); *H04J 11/0026* (2013.01); *H04B 1/7103* (2013.01); *H04B 7/024* (2013.01); *H04J 11/005* (2013.01); *H04L 5/0037* (2013.01); *H04L 5/0073* (2013.01); *H04L 2025/03426* (2013.01); *H04W 72/082* (2013.01)

(58) Field of Classification Search
CPC ..... H04B 7/024; H04B 1/7103; H04J 11/005; H04L 2025/03426; H04L 5/0037
See application file for complete search history.

(56) References Cited

U.S. PATENT DOCUMENTS

| | | | | |
|---|---|---|---|---|
| 8,369,791 | B2* | 2/2013 | Hafeez ............... | H04B 7/0452 370/252 |
| 2012/0165064 | A1* | 6/2012 | Koutsimanis ........ | H04B 7/024 455/524 |
| 2015/0029951 | A1* | 1/2015 | Sano ................... | H04W 16/28 370/329 |
| 2016/0337008 | A1* | 11/2016 | Li ....................... | H04B 7/024 |

* cited by examiner

*Primary Examiner* — Ross Varndell (57) ABSTRACT

Methods and systems are described for jointly processing multiple sectors in a wireless communication network. In one aspect, a first antenna serving a first sector is associated with a second antenna serving a second sector for joint processing. First and second antenna data is received. A plurality of wireless users associated with at least one of the first or second antenna data to model for channel estimation is determined, including an interfering wireless user connected via a third antenna serving a third sector not currently being jointly processed with the first or second antenna data. Channel estimates are determined for the plurality of wireless users. The first and second antenna data is jointly processed. Interference from the wireless user connected via a third antenna is suppressed based on a determined corresponding channel estimate for the wireless user and other received information for the wireless user.

31 Claims, 8 Drawing Sheets

*FIG. 5A*
Joint Processing

*FIG. 5B*
Channel Estimation

FIG. 6A
Joint Processing

FIG. 6B
Channel Estimation

METHODS, SYSTEMS, AND COMPUTER PROGRAM PRODUCTS FOR JOINTLY PROCESSING MULTIPLE SECTORS IN A WIRELESS COMMUNICATION NETWORK

BACKGROUND

Many commercially popular wireless communication radio access network technologies operate in a hub and spoke model. In the hub and spoke model an access point, which is typically connected to the core network, provides communication to terminals connected to the access point. Traditionally each access point operates very independently of the other access points, treating the terminals associated with the other access points as interference. Multiple input multiple output ("MIMO") technologies have demonstrated that utilizing more antennas to process the terminals is advantageous. Further advancements show that centralizing multiple access points and treating it like a larger MIMO system by jointly processing across the antennas of multiple access points is further advantageous. Research literature calls this technique cooperative MIMO, network MIMO, distributed MIMO, and/or virtual MIMO, among other names. Two popular wireless networks that are moving in this direction are Wi-Fi and cellular networks. The detailed description herein will be in the context of a cellular network, but is not intended to exclude application to other related technologies, such as Wi-Fi.

In the Long Term Evolution ("LTE") specification, Release 11, the concept of coordinated multipoint ("CoMP") was first introduced. CoMP allows for multiple cellular sites to coordinate their transmission or reception in order to minimize effective interference and increase performance. Although technically possible to use these techniques in the uplink prior to release 11, it indicated a movement to more interconnection and coordination of multiple sites.

There is also a trend towards centralizing processing of many sites in Centralized RANs ("C-RAN"). In the case of C-RAN, Remote Radio Heads ("RRHs") are placed at the antenna sites where the radio frequency ("RF") signal is digitized and transmitted, typically over fiber, to a central location for processing. The C-RAN architecture provides many benefits since the equipment is centralized, such as reducing site-leasing costs, reducing maintenance, increased deployment ease, and better energy efficiency. From a technology perspective, the Physical ("PHY") layer and Media Access Control ("MAC") layer can be enhanced to provide better interference management or suppression, among other advantages.

CoMP is related to C-RAN in that it is the standardization of the PHY/MAC technology that can leverage the C-RAN architecture. There is no actual requirement for centralization though. In fact, the only requirement is that the interfaces between sites be fast enough to support the technology. Therefore, although C-RAN is a convenient term, it is not meant to be restrictive as to the distribution of processing between the sites.

For clarification, terminology used herein is defined below using exemplary cellular-based terminology. Such terminology use is not intended to limit the subject matter described to cellular applications.

Base Station—Equipment performing the processing of antenna data. This may be located at a cellular site or at a remote site, such as in a C-RAN.

Distributed—A term used to indicate a base station that has processing independent of other sites, i.e., not C-RAN or CoMP. Specifically, no information is shared in the PHY layer between that base station and other ones.

Site—One or more antennas from one physical location. "Site" can either refer to the location or the processing of the data from that location.

Cluster—In the conventional C-RAN model, a grouping of sites and/or sectors including antennas that provide antenna data that is processed centrally.

Sector—Some portion of a site served by one or more antennas. A site may have multiple sectors, particularly when using directional antennas. A common deployment is three sectors per site. There can be as few as one sector per site, such as when omnidirectional antennas are utilized. In such cases, the terms "site" and "sector" can be used interchangeably.

In the description that follows, in most cases there is an assumption for simplicity that an omnidirectional antenna is used at a site, which results in there being one sector per site. The term "sector" is used herein but under such an arrangement the term "site" can also be used. Note that it is not intended that the subject matter described herein be limited to single sector sites.

Going a step further into the design of a traditional distributed base station architecture, without intercommunication between multiple sites or sectors, the PHY layer is then by definition also being processed in a distributed way. Distributed PHY means that the PHY layer processing is only calculated over the antennas associated with each individual sector. Typically, this means that, from the uplink perspective, only the users associated with the same sector are being processed and all other users outside of that sector are treated as interference as discussed above. The dual is also true on the downlink where the other sectors create interference at the user terminal.

As some cellular architectures have progressed beyond the distributed base stations, such as with CoMP and C-RAN, the PHY layer is able to be adapted in conjunction. Although not necessary by design, with the centralization or coordination of multiple sectors or sites, the physical layer can be enhanced to increase the performance of the network. For the uplink, treating the system as a larger MIMO receiver and jointly processing over the antennas of multiple sectors will typically improve performance.

Based on most MIMO receiver designs, such as those employing linear least square ("LS") or linear minimum mean square error ("MMSE") equalizers, channel estimates are required for the users being modeled in them. Therefore, channel estimation is conventionally performed for the users associated with the sectors utilized for joint processing. This approach can be viewed as a clustered CoMP or C-RAN.

Figure 4:
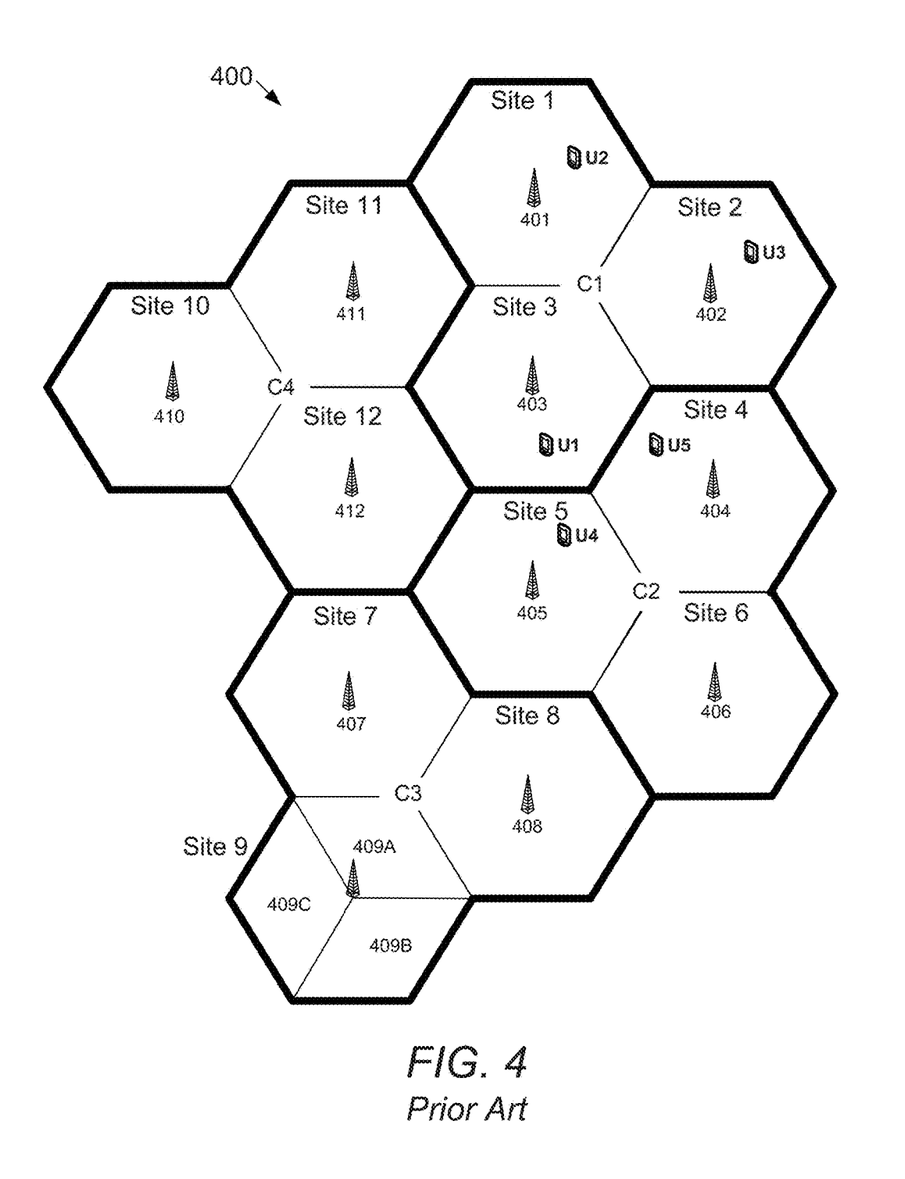
FIG. 4 is a block diagram illustrating an exemplary wireless communication system in accordance with the prior art.

FIG. 4 is a block diagram illustrating an exemplary wireless communication system in accordance with the prior art. FIG. 4 shows an example C-RAN 400. The C-RAN 400 has 12 sites, Sites 1-12, where each site is a single sector covering the area indicated by the hexagonal pattern for that site, with the exception of Site 9, which includes three sectors strictly for illustrating that a site can have multiple sectors. In this example, each of the 12 sites is shown with a corresponding antenna 401-412, respectively, attached to remote radio heads which bring that antenna data back to a central C-RAN processing point where all of the sites are processed. While only a single sector per site and only a single antenna per sector is shown in Sites 1-8 and 10-12 for the simplest case, it will be understood that a site can have multiple sectors and a sector can have multiple antennas.

Note that in the case of Site 9, there are three sectors 409A-409C, with each being served by one or more directional antennas.

FIG. 4 shows an example of a clustered C-RAN system in which there are 4 clusters, Clusters C1-C4, indicated by darker borders, where Sites 1-3 make up C1, Sites 4-6 make up C2, Sites 6-9 make up C3, and Sites 10-12 make up C4. The sites are clustered this way for clustered C-RAN processing. For example, Sites 1-3 of Cluster C1 are processed jointly by utilizing a MIMO equalizer across the antennas of the sites. Since the MIMO equalizer traditionally relies on channel estimates from each antenna to each user, channel estimation is conventionally performed from all of the antennas associated with Sites 1-3 to all of the users in Sites 1-3. In this case, user equipment ("UE") for users U1, U2, and U3 are in Sites 1, 2, and 3, respectively, and are all jointly processed and modeled for channel estimation in Cluster C1 based on antenna data from antennas 401-403 in Sites 1-3.

Although clustering is effective in increasing performance, significant degradation in system performance still exists from interference. In a sense, it can be viewed as trading off interference from edge of cell users in a distributed system to edge of cluster users in a centralized system. For example, in FIG. 4, users U4 and U5 in Sites 4 and 5 would interfere with the joint processing of Cluster C1, resulting in degradation of system performance.

Accordingly, there exists a need for methods, systems, and computer program products for jointly processing multiple sectors in a wireless communication network.

SUMMARY

Methods and systems are described for jointly processing multiple sectors in a wireless communication network. In one aspect, a first antenna serving a first sector is associated with a second antenna serving a second sector for joint processing. First and second antenna data is received. A plurality of wireless users associated with at least one of the first or second antenna data to model for channel estimation is determined, users including an interfering wireless user connected via a third antenna serving a third sector not currently being jointly processed with the first or second antenna data. Channel estimates are determined for the plurality of wireless users. The first and second antenna data is jointly processed. Interference from the wireless user connected via a third antenna is suppressed based on a determined corresponding channel estimate for the wireless user and other received information for the wireless user.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
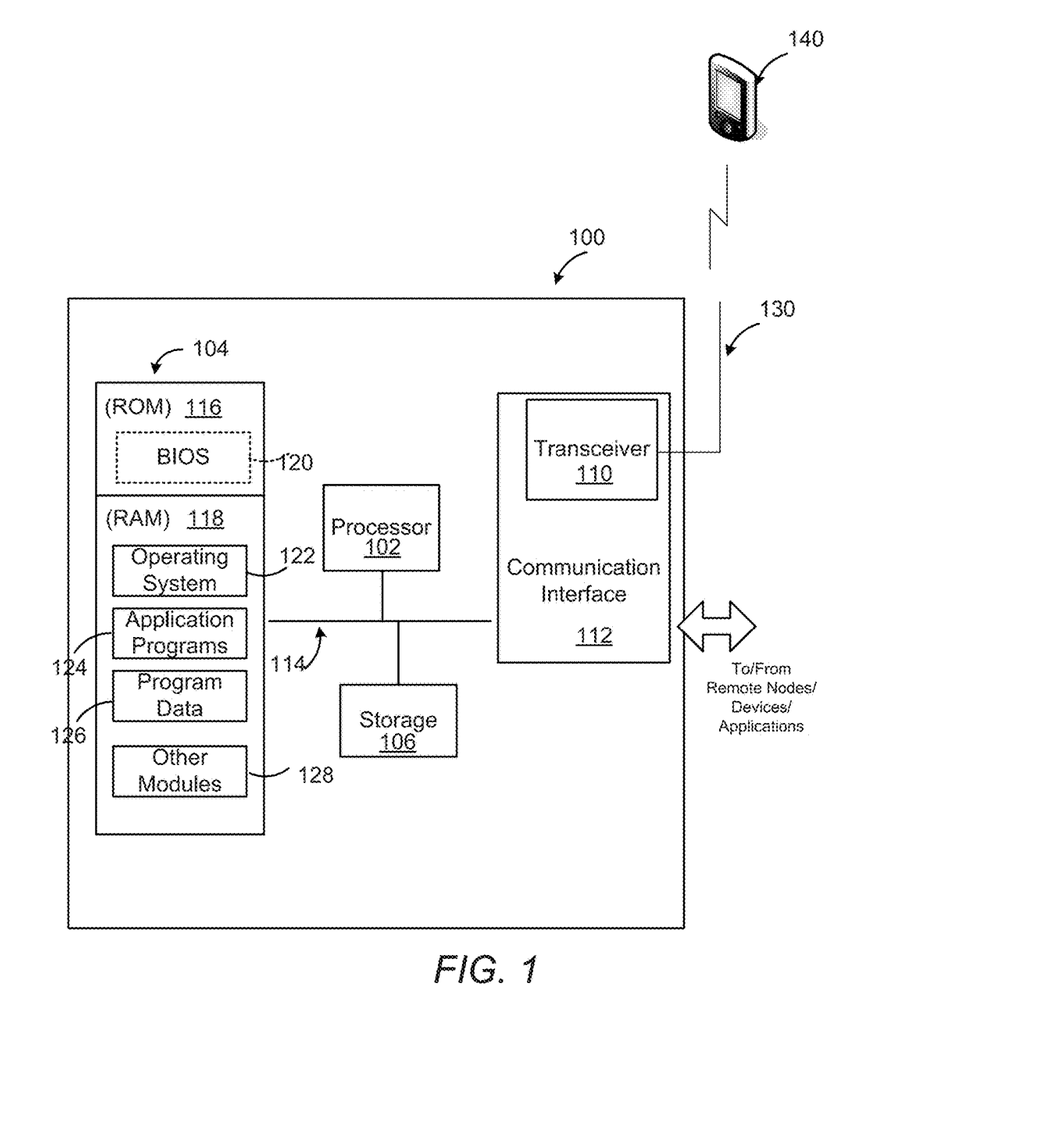
FIG. 1 is a block diagram illustrating an exemplary hardware device in which the subject matter described herein may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit ("ASIC"), a field programmable gate array ("FPGA"), etc. The processing unit 102 may be configured to execute program instructions stored in memory 104 and/or storage 106.

The memory 104 may include read only memory ("ROM") 116 and random access memory ("RAM") 118. Memory 104 may be configured to store program instructions and data during operation of device 100. In various embodiments, memory 104 may include any of a variety of memory technologies such as static random access memory ("SRAM") or dynamic RAM ("DRAM"), including variants such as dual data rate synchronous DRAM ("DDR SDRAM"), error correcting code synchronous DRAM ("ECC SDRAM"), or RAMBUS DRAM ("RDRAM"), for example. Memory 104 may also include nonvolatile memory technologies such as nonvolatile flash RAM ("NVRAM") or ROM. In some embodiments, it is contemplated that memory 104 may include a combination of technologies such as the foregoing, as well as other technologies not specifically mentioned. When the subject matter is implemented in a computer system, a basic input/output system ("BIOS") 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory ("EPROM" or flash memory); optical storage devices, including a portable compact disc ("CD"), a portable digital video disc ("DVD"), a high definition DVD ("HD-DVD"™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) and/or C-RAN central processing equipment (not shown) configured to communicate with UE 140 in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

It will be understood that, although not shown explicitly, the hardware device 100 may be part of UE 140 communicating with one or more base stations.

The hardware device 100 may operate in a networked environment using logical connections to one or more remote nodes via communication interface 112, such as one or more UEs 140 via a transceiver 110 connected to an antenna 130. Multiple UEs 140 can be dispersed throughout the network 100. A UE may be referred to as a mobile device, a terminal, a mobile station, a subscriber unit, or the like. A UE may be a cellular phone, a personal digital assistant ("PDA"), a wireless modem, a wireless communication device, a handheld device, a laptop computer, a wireless local loop ("WLL") station, a tablet computer, or the like. A UE may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access ("CDMA"), Time Division Multiple Access ("TDMA"), Frequency Division Multiple Access ("FDMA"), Orthogonal Frequency Division Multiple Access ("OFDMA"), and Single-Carrier Frequency Division Multiple Access ("SC-FDMA"). A CDMA network may implement a radio technology such as Universal Terrestrial Radio Access ("UTRA"), Telecommunications Industry Association's ("TIA's") CDMA2000®, and the like. The UTRA technology includes Wideband CDMA ("WCDMA"), and other variants of CDMA. The CDMA2000® technology includes the IS-2000, IS-95, and IS-856 standards from The Electronics Industry Alliance ("EIA"), and TIA. A TDMA network may implement a radio technology such as Global System for Mobile Communications ("GSM"). An OFDMA network may implement a radio technology such as Evolved UTRA ("E-UTRA"), Ultra Mobile Broadband ("UMB"), IEEE 802.11 ("Wi-Fi"), IEEE 802.16 ("WiMAX"), IEEE 802.20, Flash-OFDMA, and the like. The UTRA and E-UTRA technologies are part of Universal Mobile Telecommunication System ("UMTS"). 3GPP Long Term Evolution ("LTE") and LTE-Advance ("LTE-A") are newer releases of the UMTS that use E-UTRA. UTRA, E-UTRA, UMTS, LTE, LTE-A, and GAM are described in documents from an organization called the "3rd Generation Partnership Project" ("3GPP"). CDMA2000® and UMB are described in documents from an organization called the "3rd Generation Partnership Project 2" ("3GPP2"). The techniques described herein may be used for the wireless networks and radio access technologies mentioned above, as well as other wireless networks and radio access technologies.

Other examples of wireless networks include, for example, a BLUETOOTH network, a wireless personal area network, and a Wi-Fi local area network ("LAN"). Examples of wired networks include, for example, a LAN, a fiber optic network, a wired personal area network, a telephony network, and/or a wide area network ("WAN"). Such networking environments are commonplace in intranets, the Internet, offices, enterprise-wide computer networks and the like. In some embodiments, communication interface 112 may include logic configured to support direct memory access ("DMA") transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

A better compromise for complexity and performance is obtained by separating (i.e., decoupling) the channel estimation and equalization functions in terms of which UEs, sites, and/or sectors are processed for each function. In the following examples each site has one sector. Thus, the terms "sector" and "site" may be used interchangeably. It should also be understood that the concepts described apply to sectors in multiple-sector sites.

Based on either information obtained based on received antenna data or information known apriori, multiple sectors are chosen for joint processing. Joint processing is defined as incorporating antenna data from multiple sectors in the signal processing associated with decoding users. Typically, this is accomplished through using a joint equalizer or multi-user detector that uses the antenna data from the multiple sectors in the calculation.

The channel estimation is performed for data from one or more antennas associated with sectors. The decision on which users to model for channel estimation is independent of the sectors determined for joint processing. In other words, when performing the channel estimation for data from the one or more antennas associated with a sector, we do not necessarily make an attempt to model the users associated with the other antennas we are jointly processing with. Additionally, since the decision is independent of the antennas or sectors for the joint processing, the channel estimation will likely include users from sites not included in the joint processing. This assumes that knowledge of the reference signals are known, estimated, or detected for all potential interfering users.

Referring again to FIG. 4, Sites 1-3 are jointly processed (e.g., joint equalization) across antennas 401-403 associated with those sites. Conventionally, channel estimation would also be performed for antennas 401-403 associated with those sites to each of the users U1-U3 associated with Sites 1-3. In accordance with the subject matter described herein, these two functions are decoupled such that the decision on which users to model for channel estimation at which sectors is wholly or partially independent of the decision regarding joint processing of the antenna data from those sectors.

Figure 5A:
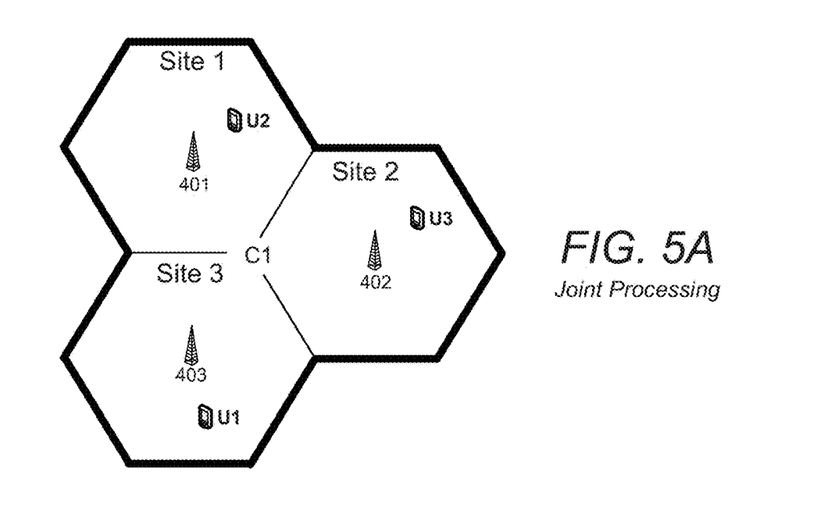
FIGS. 5A and 5B are block diagrams illustrating an exemplary arrangement for decoupling joint processing from channel estimation according to another aspect of the subject matter described herein.
Figure 5B:
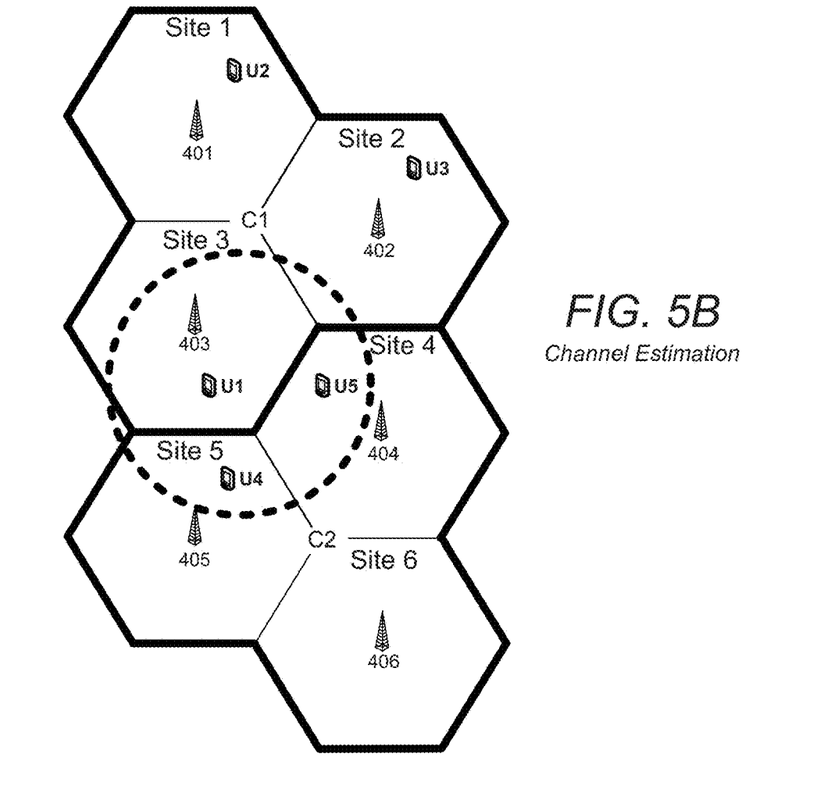

This distinction is better understood with reference to FIGS. 5A and 5B, which are block diagrams illustrating an exemplary arrangement for decoupling joint processing from channel estimation according to another aspect of the subject matter described herein. In FIG. 5A, the antenna data from antennas 401-403 in their corresponding sectors associated with Sites 1-3 for Cluster C1 is jointly processed for decoding users U1-U3. Note again that a single antenna per sector and a single sector per site is shown for simplification, but a site may have multiple sectors and a sector may have multiple antennas. In FIG. 5B, for the antenna data from antenna 403 in the sector associated with Site 3, the decision algorithm on which users to model for channel estimation is based on highest receiver power to antenna 403. Accordingly, users U1, U4, and U5 provide the highest received power and are therefore modeled in the channel estimation algorithms. In this scenario, users U2 and U3 may or may not get modeled for channel estimation. In any case, it is clear from FIG. 5B that users U4 and U5 are outside Cluster C1 in Sites 4 and 5 of Cluster C2. While they are being modeled for channel estimation in connection with Cluster C1, they are not being jointly processed (e.g., decoded) in connection with Cluster C1.

Separating the channel estimation from the joint sector decision has two main advantages. The first is that it allows for the selection of users to model for channel estimation that minimizes the error in the channel estimates. This assumes that a channel estimation technique is utilized that will jointly model all of the users together to obtain the channel estimates. Many channel estimation techniques such as LS, MMSE, and most iterative estimation techniques can be employed. The second is that obtaining channel estimates of highly interfering users allows for receivers to suppress interference from those users, particularly when used in conjunction with message passing from other receivers to provide some information about that user that the other receivers obtained in the decoding process. For example, with reference again to FIG. 5B, information about users U4 and U5 is shared by C2 and received and used in the processing for Cluster C1. That information is then utilized in the receiver chain for Cluster C1 to suppress interference from user U4 and U5.

Figure 2:
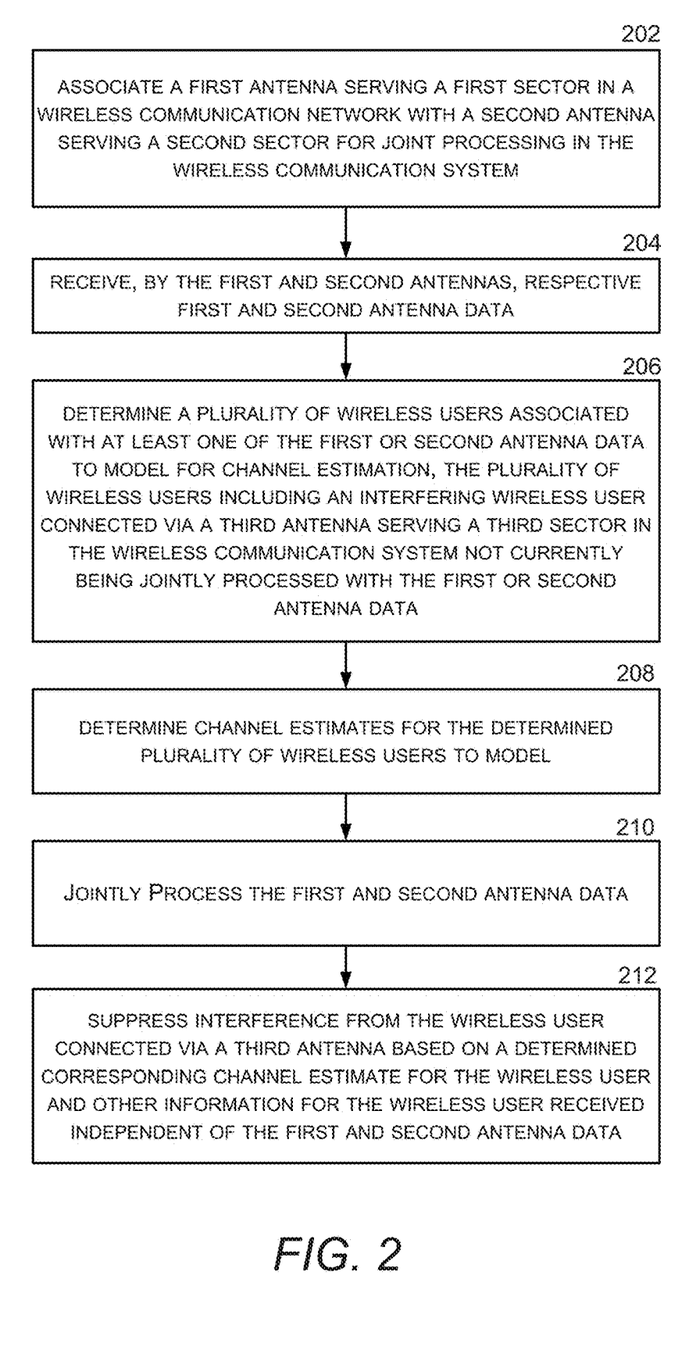
FIG. 2 is a flow diagram illustrating a method for jointly processing multiple sectors in a wireless communication network according to an aspect of the subject matter described herein.
Figure 3:
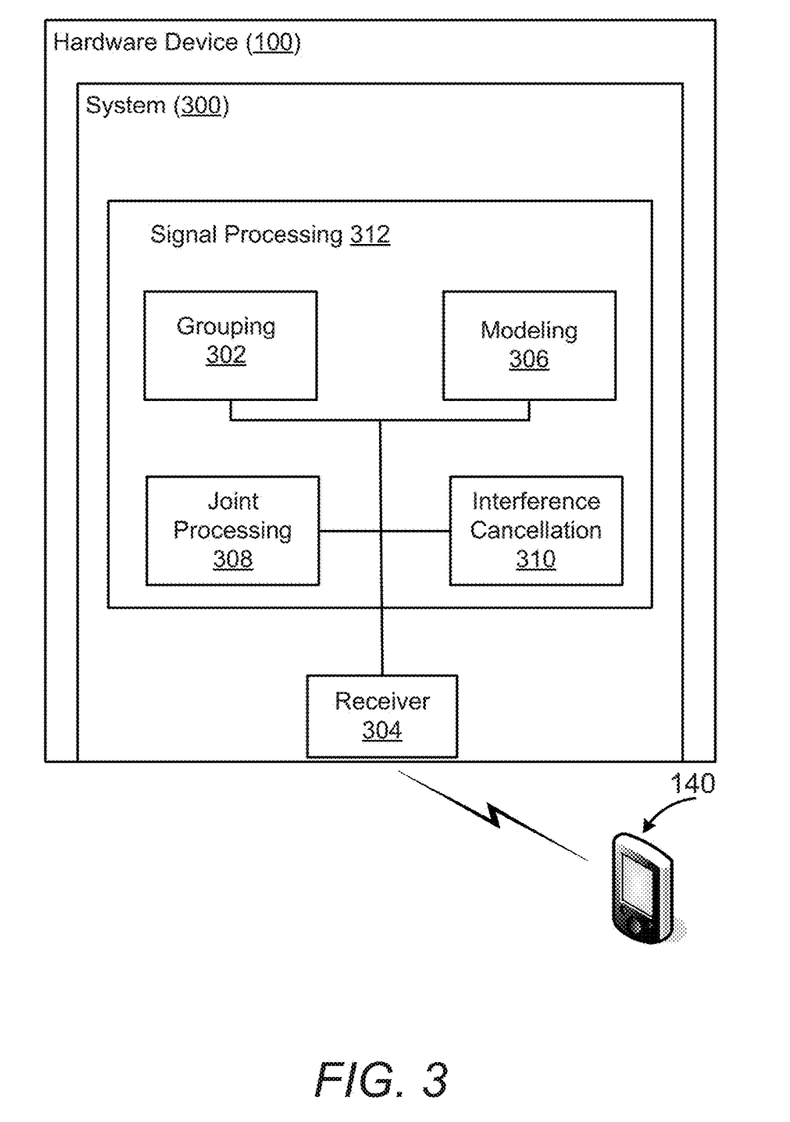
FIG. 3 is a block diagram illustrating an arrangement of components for jointly processing multiple sectors in a wireless communication network according to another aspect of the subject matter described herein.

Turning now to FIG. 2, a flow diagram is shown illustrating a method for jointly processing multiple sectors in a wireless communication network according to an exemplary aspect of the subject matter described herein. FIG. 3 is a block diagram illustrating an arrangement of components for jointly processing multiple sectors in a wireless communication network according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in a compatible execution environment, such as the environment provided by some or all of the components of the arrangement in FIG. 1. The arrangement of components in FIG. 3 may be implemented by some or all of the components of the hardware device 100 of FIG. 1.

With reference to FIG. 2, in block 202 a first antenna serving a first sector in a wireless communication network is associated with a second antenna serving a second sector for joint processing in the wireless communication system. Accordingly, a system for jointly processing multiple sectors in a wireless communication network includes means for associating a first antenna serving a first sector in a wireless communication network with a second antenna serving a second sector for joint processing in the wireless communication system. For example, as illustrated in FIG. 3, a grouping component 302 is configured to associate a first antenna serving a first sector in a wireless communication network with a second antenna serving a second sector for joint processing in the wireless communication system.

In one aspect, antennas can be associated in groups for the purpose of joint processing based on a location-based associations. For example, as shown in FIG. 5A, antennas 401-403 are situated for covering adjacent areas to form a cluster.

In a more complicated example, grouping of antennas can be based on an appropriate metric where multiple groups are compared to select the best combination. For example, the metric can be the total received instantaneous power or a long-time average of the received power from each group and/or each antenna, or some combination of the two. A combinatorial optimization approach can be employed where the solution is obtained using an exhaustive search approach for all possible groupings of the antennas, considering which group provides the best value for the metric used. The best grouping of antennas that covers the cell-area under consideration is then selected. A lower complexity solution can also be found by iteratively grouping the sites based on a metric and then removing the group from the subsequent iteration steps. Several other approaches are possible, such as the use of a convex optimization technique.

In most cellular systems, UEs monitor the power level of multiple surrounding base stations in order to determine the base station it should be connected to. These measurements are typically shared with the base stations since the base stations take part in the handover decision process. This information can be combined and accessed to compute the total received power to be fed into the cell grouping problem formulation.

Returning to FIG. 2, in block 204, first and second antenna data is received via the first and second antennas, respectively. Accordingly, a system for jointly processing multiple sectors in a wireless communication network includes means for receiving, via the first and second antennas, respective first and second antenna data. For example, as illustrated in FIG. 3, a receiver component 304 is configured to receive, via the first and second antennas, respective first and second antenna data.

Returning to FIG. 2, in block 206 a plurality of wireless users associated with at least one of the first or second antenna data to model for channel estimation is determined. As illustrated in FIG. 5B, the plurality of wireless users include an interfering wireless user connected via a third antenna serving a third sector in the wireless communication system, such as user U4 and/or user U5, which are not currently being jointly processed with the first or second antenna data, such as antenna data from any of 401-403. Accordingly, a system for jointly processing multiple sectors in a wireless communication network includes means for determining a plurality of wireless users associated with at least one of the first or second antenna data to model for channel estimation. For example, as illustrated in FIG. 3, a modeling component 306 is configured to determine a plurality of wireless users associated with at least one of the first or second antenna data to model for channel estimation.

The decision on which users to model for channel estimation can vary depending on the implementation. For example, in one aspect, the plurality of wireless users to model is determined based on at least one of the first or second antenna data. In another aspect the decision is based on received scheduling information.

The modeling component 306 can be configured to determine a plurality of wireless users to model for channel estimation based on a metric. In an aspect, the wireless users to model is determined based on received power. In another aspect, the wireless users to model is determined based on reference signal correlations among users. In yet another aspect, the wireless users to model is determined based on channel response correlations among users. In yet another aspect, wireless users to model is determined based on reference signal correlations among users.

The channel estimation user selection metric can, for example, take the top number of users based on that metric or take all users above a certain threshold. Since MIMO allows multiple data streams originating from a single user, the term user here is used generally and not meant to imply that each user has one data stream. The user selection metric may be known based on apriori data or measured and determined based on the received data.

Returning to FIG. 2, in block 208 channel estimates for the determined plurality of wireless users to model are determined. Accordingly, a system for jointly processing multiple sectors in a wireless communication network includes means for determining channel estimates for the determined plurality of wireless users to model. For example, as illustrated in FIG. 3, the modeling component 306 is configured to determine channel estimates for the determined plurality of wireless users to model.

Figure 6A:
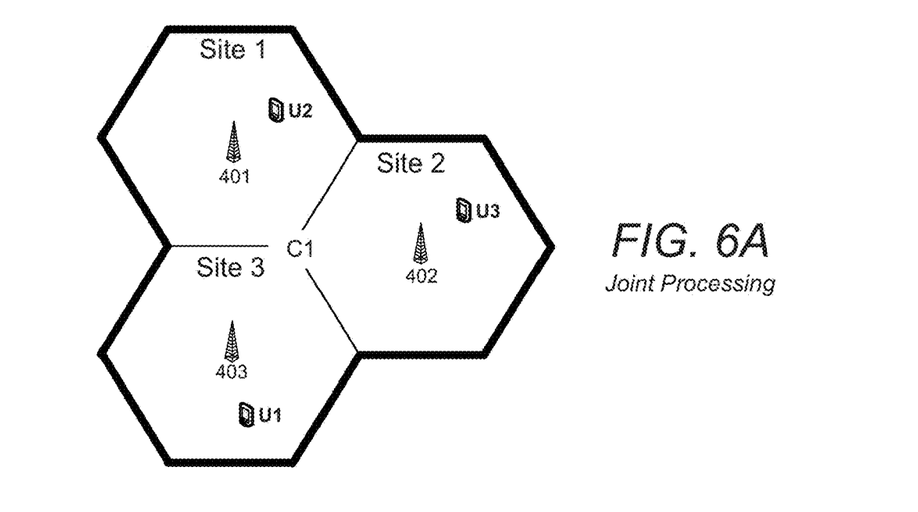
FIGS. 6A and 6B are block diagrams illustrating an exemplary arrangement for decoupling joint processing from channel estimation according to another aspect of the subject matter described herein.
Figure 6B:
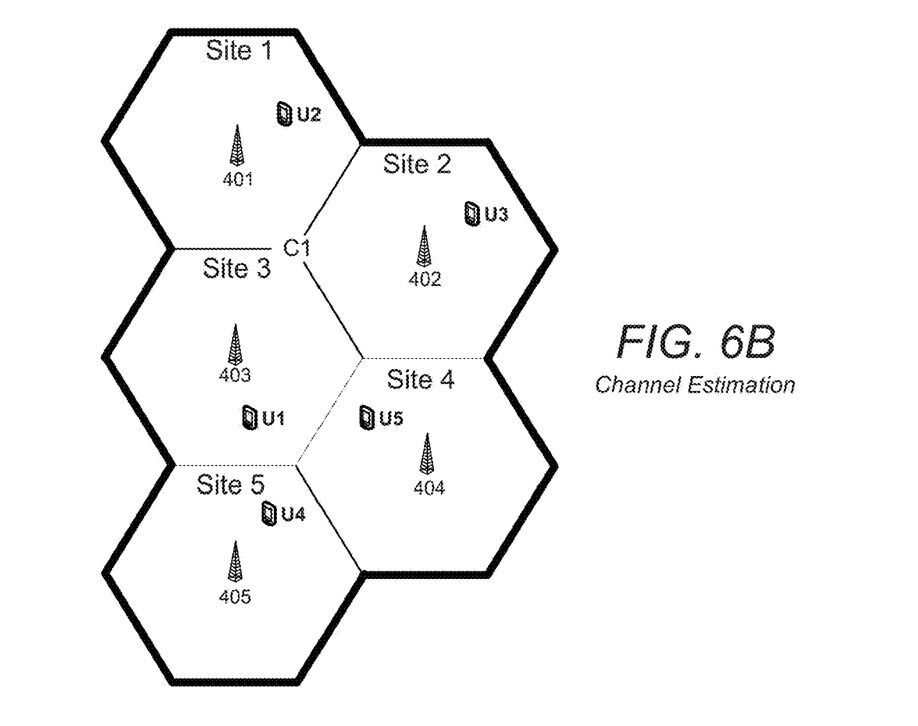

FIGS. 6A and 6B are block diagrams illustrating an exemplary arrangement for decoupling joint processing from channel estimation according to another aspect of the subject matter described herein. FIG. 6A is identical to FIG. 5A and is presented with FIG. 6B only for ease of comparison to FIG. 6B. As in FIG. 6B, the modeling component 306 can be configured to determine channel estimates for the determined plurality of wireless users by determining the channel estimates based on antenna data from an antenna outside the cluster being jointly processed in addition to the antenna data from an antenna within that cluster. Additional antennas for equalization may be included beyond the antennas associated with a sector. For example, C1, which includes antennas 401-403, may "borrow" additional antennas, such as 404 and/or 405, for use in the equalizer calculation. When antennas are "borrowed" the joint processing associated with the cluster is still responsible for only decoding the users within that cluster rather. This is in contrast to the arrangement in FIG. 6A, in which Cluster C1 includes only antennas 401-403 for joint processing purposes.

In one aspect, the modeling component 306 can be configured to determine channel estimates by determining channel estimates based on MMSE channel estimation. In another aspect, LS channel estimation can be employed.

Returning to FIG. 2, in block 210 the first and second antenna data is jointly processed. Here, jointly processing consists of at least one of jointly equalizing the first and second antenna data and jointly performing multi-user detection on the first and second antenna data. Accordingly, a system for jointly processing multiple sectors in a wireless communication network includes means for jointly processing the first and second antenna data. For example, as illustrated in FIG. 3, a joint processing component 308 is configured to jointly process the first and second antenna data.

Figure 7:
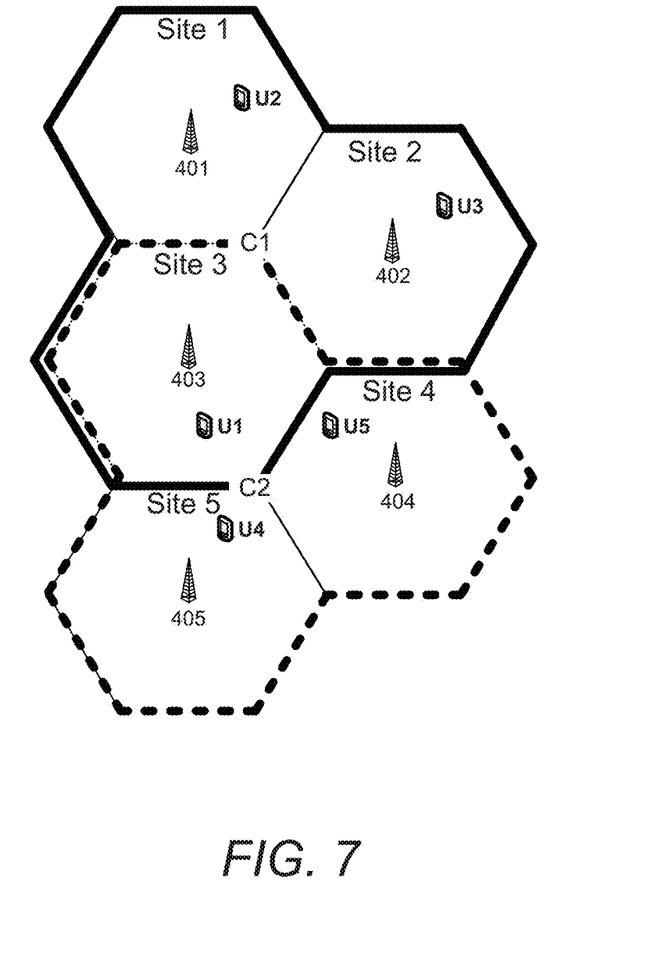
FIG. 7 is a block diagram illustrating an exemplary arrangement for jointly processing multiple sectors in a wireless communication network where one sector is shared between multiple groups according to another aspect of the subject matter described herein.

FIG. 7 is block diagram illustrating an exemplary arrangement for jointly processing multiple sectors in a wireless communication network where one sector is shared between multiple groups according to another aspect of the subject matter described herein. Antennas can be said to "overlap" multiple groups when an antenna is part of multiple joint receivers. As illustrated in FIG. 7, the data from antenna 403 in Site 3 is being jointly processed in both Cluster C1 and Cluster C2. As a result, at least user U1 may be decoded in multiple receivers, resulting in multiple "looks" at user U1. According to an aspect of the subject matter described herein, both looks are utilized in lieu of just one to improve overall quality. Information about each look is shared between Clusters C1 and C2 through message passing.

In one aspect, the joint processing component 308 chooses the "best" one of the multiple looks. The best look can be determined based on comparisons using error-vector-magnitude, mean square error, or any other appropriate metric directly related to the achievable Signal-to-Noise Ratio ("SNR") for user U1.

Alternatively, or in addition, the multiple looks at user U1 can be combined in a way to improve the overall quality. For example, a Log-Likelihood Ratio ("LLR") combining can be performed. The LLR combination can be performed at the input of the demodulator or at the output of the turbo decoder. The LLR combination essentially obtains the extrinsic information from the multiple receiver demodulated or decoded sequences and adds them with an appropriate weighting function. LLR combining at the demodulator input requires the channel coefficient information from other receivers be shared with each of the individual receivers decoding the user. LLR combining at the output of the decoder requires only the output LLR information be exchanged. Alternatively, the individual LLR combining schemes can be performed at the demodulator input and decoder output simultaneously for even better performance.

In block 212 interference from the wireless user connected via a third antenna is suppressed based on a determined corresponded channel estimate for the wireless user and other information for the wireless user received independent of the first and second antenna data. Accordingly, a system for jointly processing multiple sectors in a wireless communication network includes means for suppress interference from the wireless user connected via a third antenna based on a determined corresponding channel estimate for the wireless user and other information for the wireless user received independent of the first and second antenna data. For example, as illustrated in FIG. 3, an interference suppression component 310 is configured to suppress interference from the wireless user.

Figure 8:
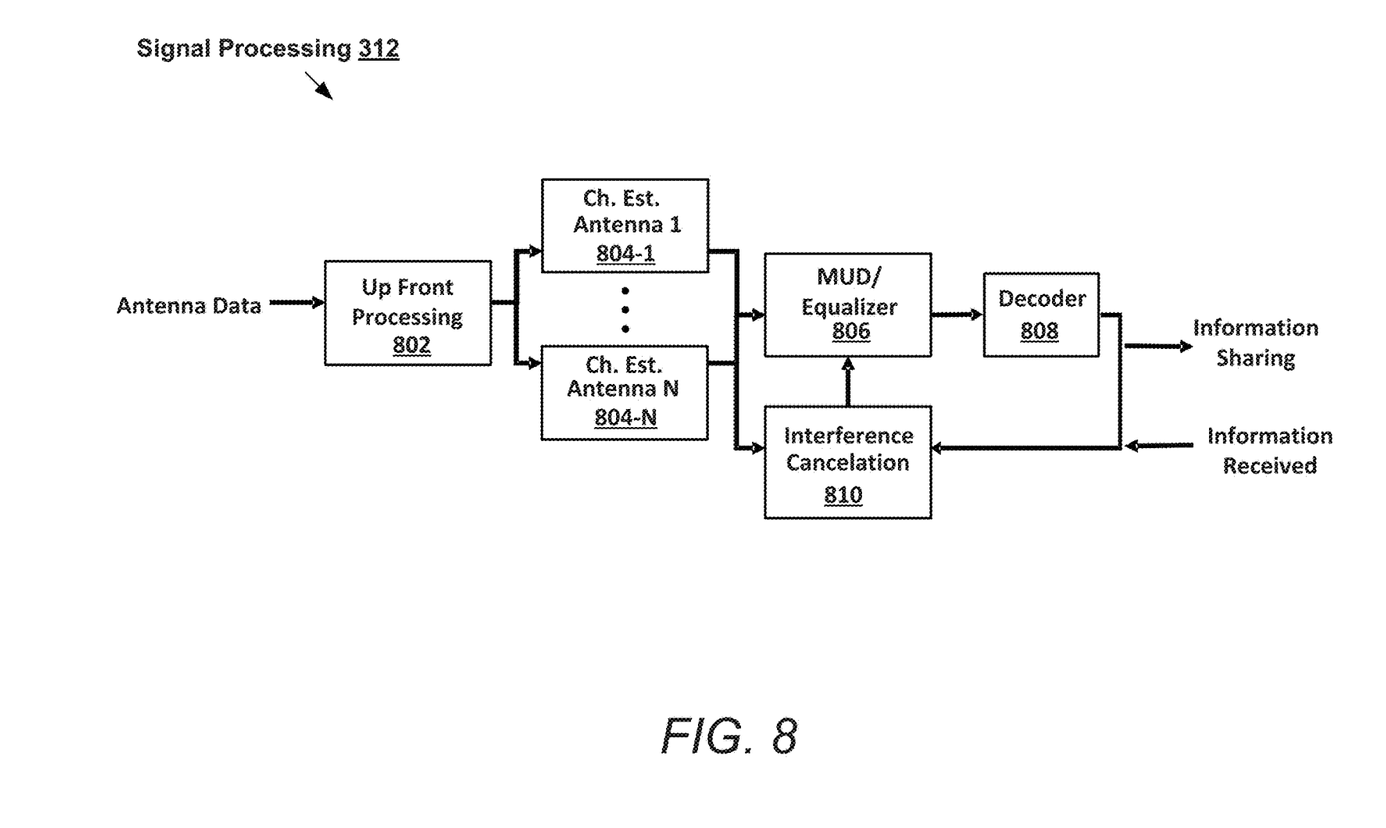
FIG. 8 is a block diagram illustrating an arrangement of components for jointly processing multiple sectors in a wireless communication network according to another aspect of the subject matter described herein.

FIG. 8 is a block diagram illustrating an arrangement of components for jointly processing multiple sectors in a wireless communication network according to another aspect of the subject matter described herein. The block diagram represents an exemplary implementation of the signal processing 312 function depicted in FIG. 3. Referring to FIG. 8, antenna data is received and up front processing 802 is typically performed. Since each antenna associated with channel estimation must model a different set of users, channel estimation is separately performed 804-1 to 804-N for each antenna associated with channel estimation. For example, with reference again to FIG. 5B, channel estimation is separately performed for each of antennas 801-803. In this example, LS channel estimation is performed that models all of the users determined for channel estimation for each antenna. All of that information is combined and sent to equalizer 806, such as an MMSE equalizer.

A multi-user detector and/or equalizer 806 uses the antenna data associated with antennas 401-403 to jointly process users U1-U3. Note that since the channel estimation function is separate from the equalization function, there may not be a channel estimate for each user from each antenna in the equalizer. For example, it is likely that one or both of antennas 401 and 402 will not produce a channel estimate for U1. It is also likely that one or more antennas 401, 402, and 403 will produce a channel estimation for U4 or U5. After equalization 806, the information may or may not be processed before being sent to a decoder 808, which results in output bits.

Separately, Cluster C2 in FIG. 5B is performing the same operations on its antennas 404-405, which are jointly processed with antenna 406. The receiver for Cluster C2 shares information through message passing about users U4 and U5 if at least one of the antennas in C1 has modeled U4 or U5, which is used in an interference cancellation component 810 to suppress interference. This process may be repeated multiple times as shown where each turbo loop contains message passing.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for jointly processing multiple sectors in a wireless communication network, the method comprising:
    associating a first antenna serving a first sector in a wireless communication network with a second antenna serving a second sector for joint processing in the wireless communication system;
    receiving, via the first and second antennas, respective first and second antenna data;
    determining a plurality of wireless users associated with at least one of the first or second antenna data to model for channel estimation, the plurality of wireless users including an interfering wireless user connected via a third antenna serving a third sector in the wireless communication system not currently being jointly processed with the first or second antenna data;
    determining channel estimates for the determined plurality of wireless users to model;
    jointly processing the first and second antenna data, wherein jointly processing consists of at least one of jointly equalizing the first and second antenna data and jointly performing multi-user detection on the first and second antenna data; and
    suppressing interference from the wireless user connected via a third antenna based on a determined corresponding channel estimate for the wireless user and other information for the wireless user received independent of the first and second antenna data.

2. The method of claim 1 wherein associating a first antenna with a second antenna includes associating antennas in groups based on at least one of received instantaneous power and received average power.

3. The method of claim 1 wherein associating a first antenna with a second antenna includes associating antennas in groups based on a location-based associations.

4. The method of claim 1 wherein determining a plurality of wireless users to model for channel estimation includes determining the plurality of wireless users to model based on at least one of the first or second antenna data.

5. The method of claim 1 wherein determining a plurality of wireless users to model for channel estimation includes determining the plurality of wireless users to model based on received scheduling information.

6. The method of claim 1 wherein determining a plurality of wireless users to model for channel estimation includes determining the plurality of wireless users to model based on received power.

7. The method of claim 1 wherein determining a plurality of wireless users to model for channel estimation includes determining the plurality of wireless users to model based on reference signal correlations among users.

8. The method of claim 1 wherein determining a plurality of wireless users to model for channel estimation includes determining the plurality of wireless users to model based on channel response correlations among users.

9. The method of claim 1 wherein determining a plurality of wireless users to model for channel estimation includes determining the plurality of wireless users to model based on reference signal correlations among users.

10. The method of claim 1 wherein determining channel estimates includes determining channel estimates based on Minimum Mean Square Error ("MMSE") channel estimation.

11. The method of claim 1 wherein determining channel estimates includes determining channel estimates based on Least Square ("LS") channel estimation.

12. The method of claim 1 wherein:
    associating a first antenna with a second antenna includes associating the second antenna in multiple groups for jointly processing the second antenna data in each of the multiple groups;
    jointly processing the first and second antenna data includes decoding a user in each of the multiple groups; and
    combining decoded information for the user from each of the multiple groups.

13. The method of claim 12 wherein the decoded information is combined using a log-likelihood ratio ("LLR") combination method.

14. The method of claim 1 wherein:
    associating a first antenna with a second antenna includes associating the second antenna in multiple groups for jointly processing the second antenna data in each of the multiple groups;
    jointly processing the first and second antenna data includes decoding a user in each of the multiple groups; and
    selecting decoded information for the user from among the multiple groups based on at least one metric.

15. The method of claim 14 wherein the at least one metric is based on at least one of signal-to-noise ratio ("SNR"), signal-to-interference-plus-noise ratio ("SINR"), and received signal strength.

16. A system for jointly processing multiple sectors in a wireless communication network, the system comprising system components including:
    a grouping component configured to associate a first antenna serving a first sector in a wireless communication network with a second antenna serving a second sector for joint processing in the wireless communication system;
    a receiver component configured to receive, via the first and second antennas, respective first and second antenna data;
    a modeling component configured to determine a plurality of wireless users associated with at least one of the first or second antenna data to model for channel estimation, the plurality of wireless users including an interfering wireless user connected via a third antenna serving a third sector in the wireless communication system not currently being jointly processed with the first or second antenna data, and configured to determine channel estimates for the determined plurality of wireless users to model; and a joint processing component configured to jointly process the first and second antenna data, wherein jointly processing consists of at least one of jointly equalizing the first and second antenna data and jointly performing multi-user detection on the first and second antenna data, a interference suppression component configured to suppress interference from the wireless user connected via a third antenna based on a determined corresponding channel estimate for the wireless user and other information for the wireless user received independent of the first and second antenna data, wherein at least one of the system components includes at least one electronic hardware component.

17. The system of claim 16 wherein the grouping component is configured to associate a first antenna with a second antenna by associating antennas in groups based on at least one of received instantaneous power and received average power.

18. The system of claim 16 wherein the grouping component is configured to associate a first antenna with a second antenna by associating antennas in groups based on a location-based associations.

19. The system of claim 16 wherein the modeling component is configured to determine a plurality of wireless users to model for channel estimation by determining the plurality of wireless users to model based on at least one of the first or second antenna data.

20. The system of claim 16 wherein the modeling component is configured to determine a plurality of wireless users to model for channel estimation by determining the plurality of wireless users to model based on received scheduling information.

21. The system of claim 16 wherein the modeling component is configured to determine a plurality of wireless users to model for channel estimation by determining the plurality of wireless users to model based on received power.

22. The system of claim 16 wherein the modeling component is configured to determine a plurality of wireless users to model for channel estimation by determining the plurality of wireless users to model based on reference signal correlations among users.

23. The system of claim 16 wherein the modeling component is configured to determine a plurality of wireless users to model for channel estimation by determining the plurality of wireless users to model based on channel response correlations among users.

24. The system of claim 16 wherein the modeling component is configured to determine a plurality of wireless users to model for channel estimation by determining the plurality of wireless users to model based on reference signal correlations among users.

25. The system of claim 16 wherein the modeling component is configured to determine channel estimates by determining channel estimates based on Minimum Mean Square Error ("MMSE") channel estimation.

26. The system of claim 16 wherein the modeling component is configured to determine channel estimates by determining channel estimates based on Least Square ("LS") channel estimation.

27. The system of claim 16 wherein:
the grouping component is configured to associate a first antenna with a second antenna by associating the second antenna in multiple groups for jointly processing the second antenna data in each of the multiple groups; and
the joint processing component is configured to jointly process the first and second antenna data by decoding a user in each of the multiple groups and to combine decoded information for the user from each of the multiple groups.

28. The system of claim 27 wherein joint processing component is configured to combine the information using a LLR combination method.

29. The system of claim 16 wherein:
the grouping component is configured to associate a first antenna with a second antenna by associating the second antenna in multiple groups for jointly processing the second antenna data in each of the multiple groups; and
the joint processing component is configured to jointly process the first and second antenna data by decoding a user in each of the multiple groups to select decoded information for the user from among the multiple groups based on at least one metric.

30. The system of claim 29 wherein the at least one metric is based on at least one of SNR, SINR, and received signal strength.

31. A non-transitory computer readable medium storing a computer program, executable by a machine, for jointly processing multiple sectors in a wireless communication network, the computer program comprising executable instructions for:
associating a first antenna serving a first sector in a wireless communication network with a second antenna serving a second sector for joint processing in the wireless communication system;
receiving, via the first and second antennas, respective first and second antenna data;
determining a plurality of wireless users associated with at least one of the first or second antenna data to model for channel estimation, the plurality of wireless users including an interfering wireless user connected via a third antenna serving a third sector in the wireless communication system not currently being jointly processed with the first or second antenna data;
determining channel estimates for the determined plurality of wireless users to model;
jointly processing the first and second antenna data, wherein jointly processing consists of at least one of jointly equalizing the first and second antenna data and jointly performing multi-user detection on the first and second antenna data; and
suppressing interference from the wireless user connected via a third antenna based on a determined corresponding channel estimate for the wireless user and other information for the wireless user received independent of the first and second antenna data.

* * * * *